Sept. 26, 1967  G. A. MITCHELL  3,343,471
CAMERA VIEWFINDER

Filed July 1, 1965  2 Sheets-Sheet 1

INVENTOR.
GEORGE A. MITCHELL
Forrest J. Lilly
ATTORNEY

United States Patent Office 3,343,471
Patented Sept. 26, 1967

3,343,471
CAMERA VIEWFINDER
George A. Mitchell, 687 Prospect Crescent,
Pasadena, Calif. 91103
Filed July 1, 1965, Ser. No. 468,883
4 Claims. (Cl. 95—42)

This application is a continuation-in-part of my co-pending application, Ser. No. 389,875, filed Aug. 17, 1964 (now abandoned) for Camera Viewfinder.

The present invention relates generally to optical viewfinder systems for cameras, and more particularly to improvements in camera viewfinders of the type which eliminate parallax between the viewfinder system and the picture taking system.

In the photographic industry, it has been common practice for many years to provide cameras with optical viewfinder systems designed to avoid parallax. In still cameras of the single lens reflex type, the non-parallax viewfinder system usually includes a fully reflecting mirror which is pivotally mounted for movement between two positions, the first position being one wherein the mirror intersects the optical axis of the picture taking system behind the objective lens, and the second position being one wherein the mirror is swung out of the way of the picture taking system. In the first mirror position, the viewfinder system sees the same image produced by the camera objective lens. However, before the shutter is tripped to actually take the picture, the reflex mirror pivots out of the way to its second position. Hence, the subject being photographed cannot be continuously observed by the viewfinder system during the actual picture taking operation. However, the mirror is restored to its first position before the next picture is taken so that the subject can again be viewed.

In motion picture cameras, where the subject being photographed must be continuously viewed throughout the picture taking operation, it has been common practice to utilize a reflex viewfinder system which is very similar to that used with still cameras. However, the viewfinder mirror is permanently fixed in its optical axis intersecting position behind the camera objective lens, rather than being pivotally mounted so that it can be moved out of the way. In addition, the viewfinder mirror used with the latter system is a partially transparent mirror instead of a fully reflecting mirror. Hence, a portion of the image forming light entering the camera objective lens is constantly directed to the viewfinder system, with the remainder of the image forming light being directed to the film plane of the camera. Unfortunately, although the latter viewfinder system does eliminate parallax while permitting continuous observation of the subject being photographed, the division of image forming light between the viewfinder system and the picture taking system results in an attenuation of image brightness for both systems. Consequently, the effective aperture stop of the camera objective lens is considerably reduced.

An additional problem confronting designers of camera viewfinder systems has been the difficulty of obtaining sufficient viewfinder image brightness, especially where image erecting and reverting optics tend to limit the maximum practical aperture stop of the viewfinder system.

Hence, there has been a long existing need in the photographic industry for a non-parallax viewfinder system which provides a relatively bright viewfinder image, which does not have any substantial effect upon the effective aperture of the camera objective lens, and which permits continuous observation of the subject being photographed during the picture taking operation.

Accordingly, it is an object of the present invention to provide a new and improved camera viewfinder system which overcomes the above and other disadvantages of the prior art.

Another object is to provide a new and improved camera viewfinder which eliminates parallax between the viewing and picture taking systems while permitting continuous viewing of the subject being photographed during the picture taking operation.

A further object is to provide a new and improved camera viewfinder system with enhanced viewfinder image brightness.

Still another object of this invention is the provision of a new and improved non-parallax camera viewfinder system of relatively simple construction, yet capable of producing brighter viewfinder and film plane images while enabling constant viewfinder observation of the subject being photographed throughout the picture taking process.

The above and other objects and advantages of this invention will become apparent from the following description, when taken in conjunction with the accompanying drawings of an illustrative embodiment thereof, and wherein:

FIG. 5 is a sectional view, taken along the line 5—5 in FIG. 1, and illustrates the viewfinder screen.

Briefly, and in general terms, the foregoing objectives are achieved by providing a reflex viewfinder system wherein the viewfinder mirror does not intercept any of the light directed by the camera objective lens to the film plane, but rather receives only a portion of that light from the subject being photographed which does not enter the camera objective lens. Hence, the light forming the viewfinder image is not sampled from the light which would normally form the film plane image, with the consequent result that the viewfinder system has no effect upon the light intensity of the film plane image. Yet the reflex mirror and camera objective lens observe the subject being photographed along a common optical axis so that parallax is avoided. In addition, the viewfinder mirror is employed as the first reflecting surface of a four-reflection Porro prism type erecting and reverting system, enabling closer spacing between viewfinder lens elements. Hence, a shorter focal length viewfinder objective lens is employed and this results in increased image brightness without the necessity for increasing the diameter of the viewfinder objective lens.

Figure 1:
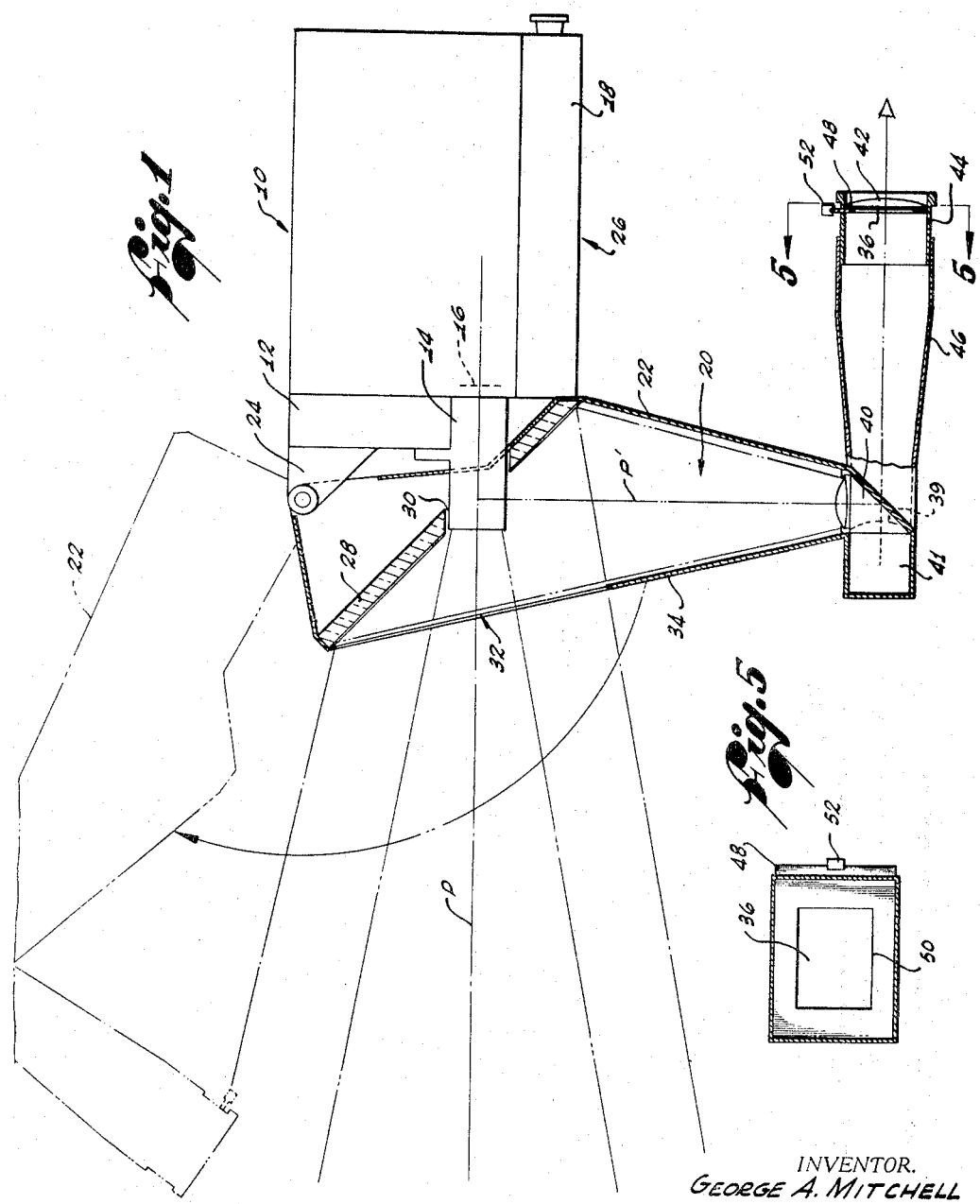
FIG. 1 is a plan view of a camera embodying a viewfinder system in accordance with the present invention, portions of the viewfinder system being shown in section to illustrate internal construction, and further illustrates, in phantom, a position of the viewfinder housing enabling convenient access to the camera body.

Referring now to the drawings, and particularly to FIG. 1 thereof, there is shown a camera 10 having a camera body 12 and a conventional objective lens 14 mounted at the forward end of the camera body for forming an image upon a photographic film 16 within the camera during the picture taking operation.

A conventional focusing tube 18 is mounted at one side of the camera body 12 and is adapted to be selectively positioned behind the film plane of the camera, to enable precise focusing of the objective lens 14 on a specific subject which it is desired to photograph.

The camera 10 may be either a motion picture camera or a still camera, and the objective lens 14 may be either fixed or interchangeably mounted upon the camera body 12.

A camera viewfinder system 20 is carried within a suitable housing 22 which is pivotally mounted upon a camera bracket 24 secured to the forward end of the camera body 12. This pivotal arrangement enables the viewfinder system to be swung out of the way whenever it is desired to have convenient access to the side 26 of the camera body 12, as when loading or removing film from the camera. However, it is to be understood that, if the dimensions and design of a particular camera and viewfinder are such that the viewfinder housing 22 does not interfere in any way with other camera operations, the housing 22 may be mounted in a single fixed position upon the camera body 12, rather than being pivotally mounted to the camera body, without in any way departing from the spirit and scope of the present invention.

Within the viewfinder housing 22, and supported thereby, is a front surfaced mirror 28 which is inclined at a 45° angle to the optical axis P of the camera objective lens 14. The camera objective lens 14 extends through a hole 30 in the mirror 28, the hole being centered about the intersection of the mirror with the optical axis P' of the viewfinder system 20. The dimensions of the hole 30 in the mirror 28 must be sufficiently large to provide clearance for the objective lens 14 when the viewfinder housing 22 is pivoted from its solid line position to its phantom line position indicated in FIG. 1. In this connection, if the camera body 12 is adapted to receive the interchangeable lenses, then the hole 30 must provide such clearance for the largest diameter objective lens 14 which may conceivably be mounted upon the camera body 12.

An aperture 32 is provided in the forward side 34 of the viewfinder housing 22 to permit light from a subject (not shown) to reach the objective lens 14 and the viewfinder mirror 28. The size of the aperture 32 must be sufficient so that no portion of the viewfinder housing 22 will fall within the angle of acceptance or field of view of the camera objective lens 14. In this connection, the field of view of the viewfinder system, and hence the angle of acceptance of the viewfinder system as defined by the extremities of the aperture 32 and the viewfinder mirror 28, must be equal to or greater than the largest field of view of any of the interchangeable objective lenses which may be mounted upon the camera body 12.

The optical axis P of the camera objective lens 14 coincides with the optical axis of the viewfinder system 20 between the subject being photographed and the reflex viewfinder mirror 28. Hence, there is no parallax between what is observed by the viewfinder system and what is observed by the picture taking system.

Since the camera objective lens 14 projects through the hole 30 in the mirror 28, the picture taking system is completely independent of the viewfinder system and, hence, the viewfinder mirror does not intercept any light which would normally enter the objective lens 14 and be used to form an image on the film 16. It is thus apparent that the viewfinder system does not reduce the effective aperture stop of the objective lens 14.

The light received by the mirror 28 from the subject being photographed is reflected along the optical axis P' of the viewfinder system 20 to appropriate image forming optics for producing an image of the subject upon a viewfinder screen 36 such as a ground glass screen or the like. The viewfinder image forming optics includes a pair of lenses 38, 39 and a multiple reflection system, such as prisms 40, 41 or the like, to correct for image inversion and lateral image reversal due to the lenses 38, 39. A lens 42 is also included in the viewfinder system between the screen 36 and the eye of the observer to enlarge the image of the viewfinder screen. In the particular embodiment illustrated, the lens 42 is a plano-convex element and the screen 36 is actually the ground planar surface of the lens 42.

The image formed on the viewfinder screen 36 does not normally include an image of the objective lens 14 projecting through the hole 30 at the center of the reflex mirror 28. The reason for this is that the viewfinder system is normally focused on a subject plane which is at such a great distance beyond the subject plane in which the camera objective lens is located that the image of the camera lens is completely out of focus and so thoroughly diffused over the viewfinder screen 36 as to be completely unobservable. In this connection, the virtual image of the subject being photographed is the same distance behind the mirror 28 as it is in front of the mirror 28. Hence, the distance from this virtual image to the lens 38 of the viewfinder system is likely to be hundreds or thousands of times greater than the distance from the camera lens 14 to the viewfinder lens 38. The only effect of the hole 30 in the mirror 28 upon the image formed at the viewfinder screen 36 is a very slight attenuation of image brightness, the attenuation being in the ratio of the cross-sectional area of the hole 30 to the total reflecting area of the mirror 28. For all practical purposes, the attenuation will be unnoticeable to the human eye.

Figure 2:
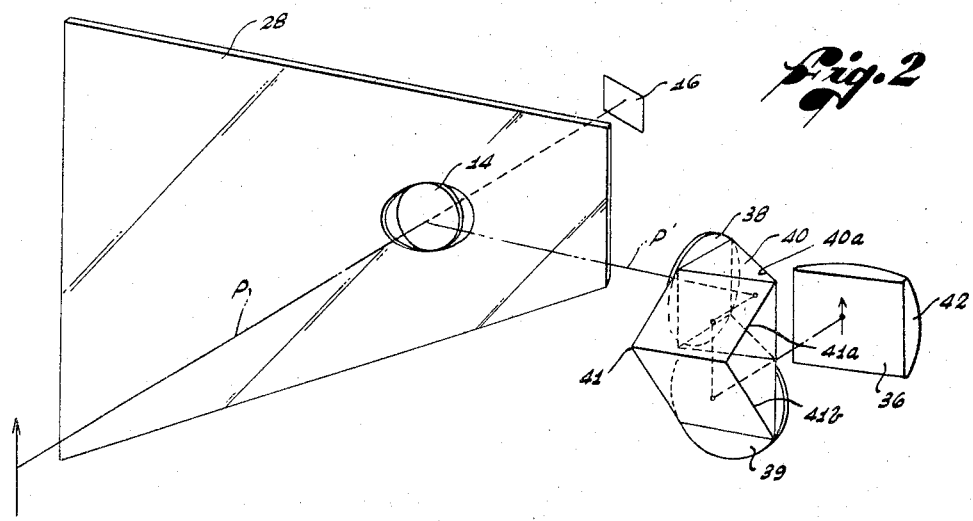
FIG. 2 is a perspective view of the optical system shown in FIG. 1, and illustrates further details of the viewfinder prism construction.

The manner in which the viewfinder system 20 corrects for image inversion and reversal while providing a relatively bright output image upon the screen 36 is best observed in FIG. 2. In this connection, the prism 40 is a right angle, total reflection prism which cooperates with the mirror 28 to correct for lateral image reversal in the same manner as a Porro prism. The prism 41 is a true Porro prism providing two reflections to correct for image inversion and thereby provide an erect output image. Hence, the mirror 28 and reflecting surfaces 40a, 41a, 41b of the prisms 40, 41, respectively, perform the function of a conventional Porro prism image erection and reversion system well known in the art. However, the structure of the system is such that the first reflecting surface, i.e., mirror 28, of the Porro prism type system is positioned between the object and the viewfinder objective lens 38 along the optical axis of the system.

As a result of the optical configuration shown in FIG. 2, only three of the four corrective reflections take place between the lenses 38 and 39 of the viewfinder image forming optics, the lens 38 being adjacent the input face to the prism 40 while the lens 39 is located adjacent the output face of the prism 41. Hence, the lenses 38 and 39 are spaced closer together than they would be if all four corrective reflections had to take place between them.

Figure 3:
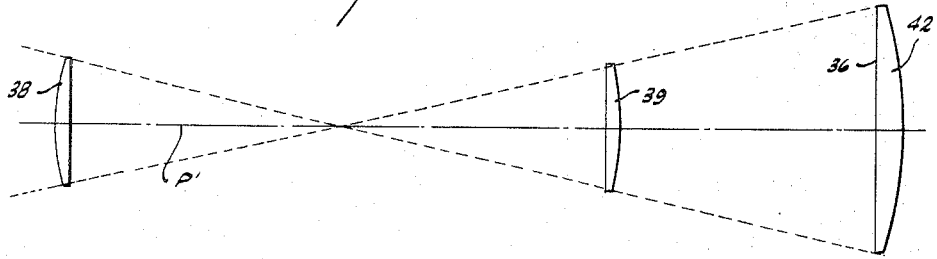
FIGS. 3 and 4 are optical schematic diagrams illustrating the manner in which a brighter viewfinder image is obtained in accordance with the present invention.
Figure 4:
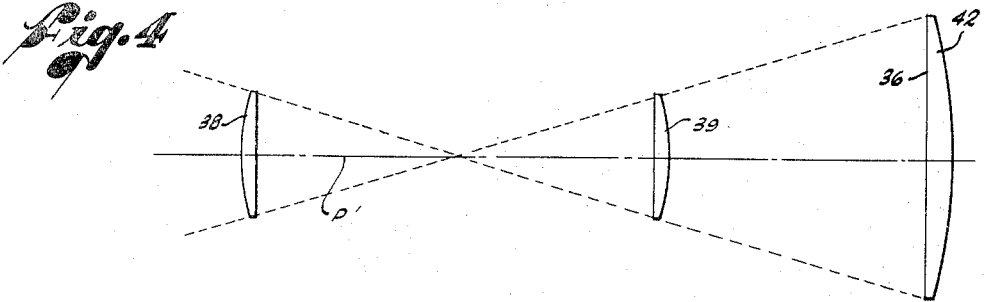

FIGS. 3 and 4 schematically illustrate the change in spacing between the lenses 38 and 39 facilitated by the optical arrangement of FIG. 2. In this connection, FIG. 3 illustrates the relative spacing along the optical axis P' between the lenses 38 and 39 for a full four reflection Porro prism correction system between the lenses 38 and 39, whereas FIG. 4 illustrates the relative spacing between these lenses in the modified system of FIG. 2 wherein only three corrective reflections take place between the lenses 38, 39.

Since the lenses 38, 39 can be placed closer together, the lens 38 is of shorter focal length in order to provide an image at the proper location for projection by the lens 39 onto the screen 36. Hence, if the diameter of the objective lens 38 in FIG. 4 is kept the same as the diameter of the lens 38 in FIG. 3, the reduction in focal length produces a corresponding increase in the aperture stop of the viewfinder system. This follows from the well-known relation:

$$\text{aperture stop} = D/f$$

where

D is the diameter of the lens, and
$f$ is the focal lengths of the lens.

Referring now again to FIG. 1, the lens 42 and screen 36 are mounted within a focusing tube 44, so that the position of the screen relative to the viewfinder image forming optics can be varied to selectively focus the viewfinder upon subjects at different distances from the camera 10. In this connection, the focusing tube 44 is slidably received in a larger sleeve 46 attached to the viewfinder housing 22.

Since the field of view of the viewfinder system may exceed that of the camera objective lens 14, especially where the viewfinder system is to be used with a wide variety of different lenses from wide angle to telephoto, it is desirable to provide some indication of the field covered by the camera lens. As best observed in FIGS. 1 and 5, this is accomplished by providing a mask 48 adjacent the screen 36 to superimpose upon the viewfinder image the field of view boundaries 50 of the camera picture taking system. Each mask 48 is provided with a handle 52 and can be inserted through an appropriate slot in one side of the focusing tube 44 to place the mask adjacent the screen 36 whenever a camera lens 14 having the field of view characteristics defined by that particular mask is being used. Each mask 48 may have an opaque border with a clear central portion defined by the boundaries 50 or, alternatively, the entire mask may be transparent except for the field of view boundary lines 50.

Of course, if desired, the mask 48 can be dispensed with entirely, and the lines 50 for one or more lenses can be applied directly to the surface of the screen 36.

The present invention satisfies a long existing need in the optical industry for a non-parallax camera viewfinder which provides a relatively bright viewfinder output image and permits continuous viewing of the subject being photographed without reducing the effective aperture stop of the camera objective lens.

It will be apparent from the foregoing that, while a particular form of my invention has been illustrated and described, various modifications can be made without departing from the spirit and scope of my invention. Accordingly, I do not intend that my invention be limited, except as by the appended claims.

I claim:

1. A camera, comprising:
   a camera body;
   a camera objective lens mounted at the forward end of said camera body;
   a viewfinder housing pivotally mounted upon said camera body on an axis positioned laterally of said objective lens and arranged to swing said housing laterally out of the maximum field of view of said objective lens, said housing having an aperture therein in front of said objective lens;
   a planar reflex mirror supported within said housing behind said aperture and outside the field of said objective lens, said mirror having a hole therein for permitting light to pass through said mirror and said objective lens, said mirror being inclined at 45° to the optical axis of said lens so that said mirror and said lens both receive light directly from the same subject along a common optical axis, the field of view defined by said aperture and said mirror being at least as great as the maximum field of view of any objective lens mounted upon said camera body;
   a viewfinder screen mounted within said viewfinder housing; and
   optical means for focusing the light reflected from said mirror to form an image upon said screen of the subject observed by said mirror and said lens.

2. A camera, comprising:
   a camera body;
   a camera objective lens mounted at the forward end of said camera body;
   a viewfinder housing pivotally mounted upon said camera body, said housing having an aperture therein in front of said objective lens;
   a planar reflex mirror supported within said housing behind said aperture and outside the field of said objective lens, said mirror having a hole therein for permitting light to pass through said mirror and said objective lens, said mirror being inclined at 45° to the optical axis of said lens so that said mirror and said lens both receive light directly from the same subject along a common optical axis, the field of view defined by said aperture and said mirror being at least as great as the maximum field of view of any objective lens mounted upon said camera body;
   a viewfinder screen mounted within said viewfinder housing;
   first and second viewfinder lenses for focusing the light reflected from said mirror to form an image upon said screen of the subject observed by said mirror and said lens; and
   light reflecting means within said viewfinder housing and cooperating with said reflex mirror for correcting the image formed by said first and second viewfinder lenses for image inversion and lateral image reversal, said light reflecting means providing three reflection surfaces between said first and second viewfinder lenses, whereby said light reflecting means and said reflex mirror provide a Porro prism type image erecting and reverting system.

3. A camera as set forth in claim 2, including means for masking said screen to indicate the field of view of said camera objective lens.

4. A camera as set forth in claim 2, wherein said camera objective lens is removably mounted upon said camera body in an interchangeable lens arrangement.

References Cited

UNITED STATES PATENTS

| | | | |
|---|---|---|---|
| 1,573,401 | 2/1926 | Heine | 95—42 |
| 2,284,562 | 5/1942 | Dittmann | 95—42 |
| 2,401,530 | 6/1946 | Vought | 95—42 X |
| 2,753,760 | 7/1956 | Braymer | 95—42 X |
| 3,043,181 | 7/1962 | Brown | 88—1.5 |
| 3,250,195 | 5/1966 | Maitani | 95—42 |

JOHN M. HORAN, *Primary Examiner.*